(No Model.)
W. E. TEMPLETON.
COMBINED FILTER, COOLER, AND REFRIGERATOR.
No. 308,580. Patented Nov. 25, 1884.
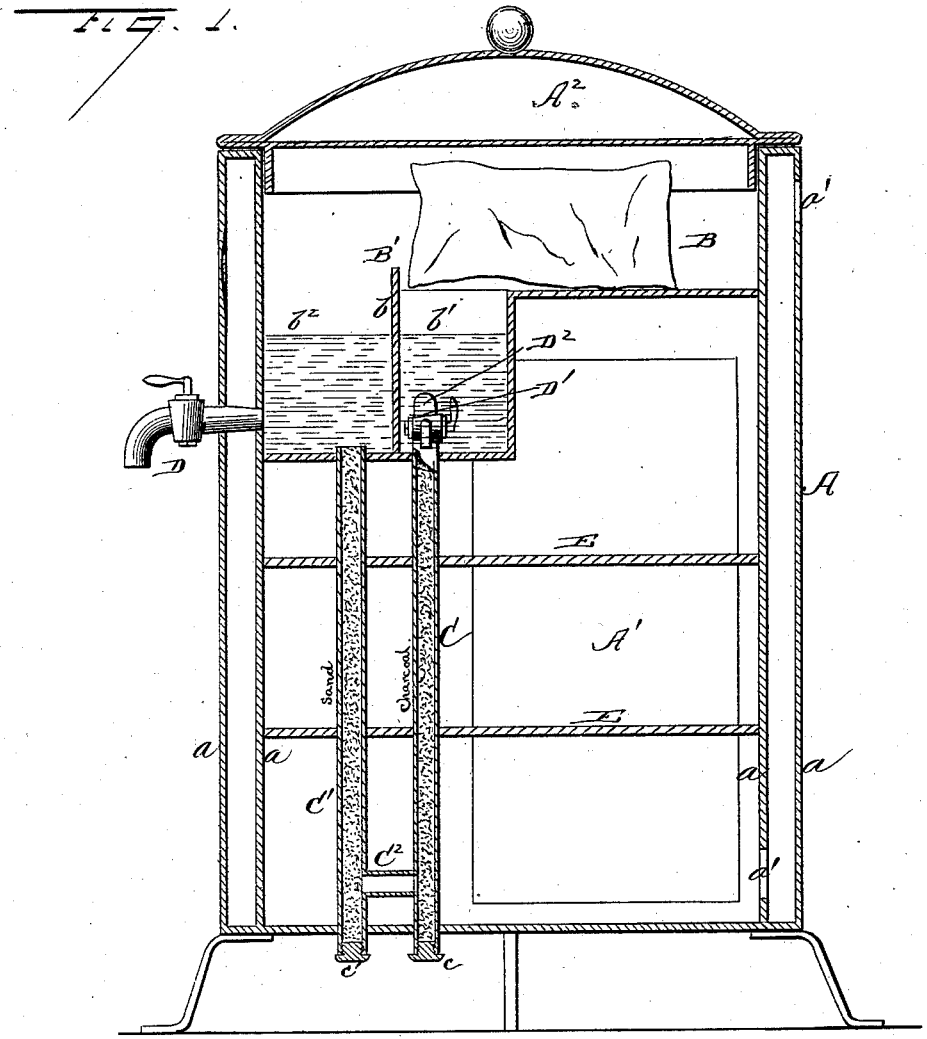
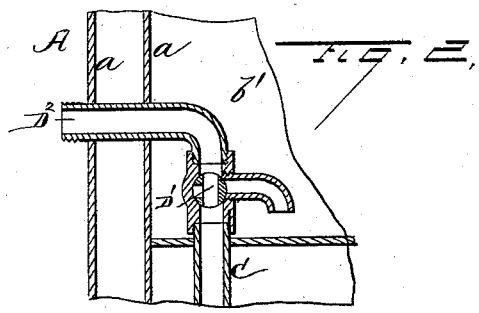

UNITED STATES PATENT OFFICE.

WILLIAM E. TEMPLETON, OF CHICAGO, ILLINOIS, ASSIGNOR OF ONE-HALF TO MELVIN B. GIFFORD, OF SAME PLACE.

COMBINED FILTER, COOLER, AND REFRIGERATOR.

SPECIFICATION forming part of Letters Patent No. 308,580, dated November 25, 1884.

Application filed April 24, 1884. (No model.)

*To all whom it may concern:*

Be it known that I, WILLIAM E. TEMPLETON, a citizen of the United States, residing at Chicago, in the county of Cook and State of Illinois, have invented certain new and useful Improvements in Combined Filters, Coolers, and Refrigerators, of which the following is a specification, to wit:

This invention relates to an improvement in combined filters, coolers, and refrigerators; and it consists in certain peculiarities of construction and arrangement, substantially as will be hereinafter more fully set forth and claimed.

In order to enable others skilled in the art to which my invention appertains to make and use the same, I will now proceed to describe its construction and operation, referring to the accompanying drawings, in which—

Figure 1 is a central vertical section of my invention, and Fig. 2 is a detail view of the upper end of the filtering-pipe.

A represents the body of my device, formed of two shells, $a\ a$, provided with the openings $a'\ a'$, to admit of the escape of the foul or heated air from the inside. The body of the refrigerator is provided with a suitable door, $A'$, and removable cover $A^2$, all of which may be made of any suitable material and in any desired form. The upper part of the body A is formed with an ice-chamber, B, access to which is had by means of the cover, and the bottom of which chamber is formed on one side with a well or depression, $B'$, divided by a partition, $b$, into two chambers, one of which receives the drippings from the ice and the other the filtered water for drinking.

From the drip-receptacle $b'$ a pipe, C, extends downward through the bottom of the device, and is closed at its lower end by a plug, $c$. A similar pipe, $C'$, extends down from the drinking-water receptacle $b^2$, and is closed at its lower end by a plug, $c'$. The pipes C C' are connected near their lower ends by a short section, $C^2$, and one of these pipes is filled with charcoal and the other with sand or gravel, as indicated in the drawings. The drippings from the melting ice fall into the receptacle $b'$, and, passing down through the pipe C and up through pipe $C'$, are retained in the receptacle $b^2$ for drinking purposes, being drawn off through a spigot, D, in the side of the casing. The chambers $b'\ b^2$, being open at the top and in close relation to the ice, will always be sufficiently cool, and they are large enough to hold all the drip from the ice that may be placed in the device without danger of overflow and consequent injury to carpets, &c.

To enable the filter to be used for other than the drip-water, I provide the upper end of the pipe C with a three-way valve, $D'$, and connect therewith a small pipe, $D^2$, running through the side of the refrigerator, and screw-threaded on its outer end to receive a hose or similar connection with the hydrant or water system of the house. By reference to Fig. 2 it will be at once seen that this valve $D'$ may be turned to make a direct connection between the pipes $D^2$, C, or the chamber $b'$ and pipe C at pleasure, and thus water from the hydrant can be filtered at any time without disturbing the cool drippings from the ice. The lower portion of the body is provided with suitable shelves, E, to receive butter and other articles to be preserved, and the device is thus made convenient and economical in construction and operation, and can be used in any room without fear of the drip spoiling the carpets, as so often happens.

It will be observed that the drip-receptacle may be placed in any convenient position and of any desired form within the main casing, and as it is of sufficient size to hold all the drip which can accumulate from the ice in the chamber B, and has no outlet or waste pipe through the casing, (as is usual,) it is absolutely safe, and there can be no possible damage by carelessness or neglect.

It is evident that, if desired, the ice and drip chambers may be one and the same without departing from the spirit of my invention.

Having thus fully described my invention, what I claim as new, and desire to secure by Letters Patent, is—

1. The combination, with an ice-chamber provided with a drip-chamber and a drinking-water receptacle, of a connecting-pipe filled with filtering material and provided with a hydrant-connection on one end, provided with a three-way valve, whereby the filter may be used for the drippings or for hydrant water at pleasure, substantially as and for the purpose set forth.

2. The ice-chamber B, having its bottom provided with a well, B', divided into two parts by a partition, b, in combination with the pipes C C', filled with charcoal and gravel, and connected by a short pipe, C², whereby the drippings from the ice are filtered and used for drinking purposes, substantially as shown and described.

3. The combination, with the ice-chamber B, having a well, B', divided into two parts, of the filtering-pipes C C' C², the former being connected to a short section, D², extending through the side of the casing, and provided with a three-way valve, D', within the drip-chamber, substantially as and for the purpose set forth.

4. A combined water cooler, filter and refrigerator having the double shell A, formed with air-openings $a'$ $a'$, the ice-chamber B, drip-receptacle $b'$, and drinking-water compartment $b^2$, in combination with the filtering-pipes C C' C², connecting these two compartments, the hydrant-connection D², and valve D', all constructed and arranged to operate substantially as and for the purpose set forth.

In testimony whereof I affix my signature in presence of two witnesses.

WILLIAM E. TEMPLETON.

Witnesses:
  W. C. McArthur,
  A. S. Paré.